United States Patent
Zhou

(10) Patent No.: US 11,637,503 B2
(45) Date of Patent: Apr. 25, 2023

(54) FREQUENCY CONVERTER, FREQUENCY CONVERTER ASSEMBLY, AND CONTROL METHOD THEREOF

(71) Applicant: SIEMENS AKTIENGESELLSCHAFT, Munich (DE)

(72) Inventor: Ya Jun Zhou, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 121 days.

(21) Appl. No.: 16/647,224

(22) PCT Filed: Sep. 14, 2017

(86) PCT No.: PCT/CN2017/101748
§ 371 (c)(1),
(2) Date: Mar. 13, 2020

(87) PCT Pub. No.: WO2019/051718
PCT Pub. Date: Mar. 21, 2019

(65) Prior Publication Data
US 2020/0220472 A1     Jul. 9, 2020

(51) Int. Cl.
*H02M 5/458*     (2006.01)
*H02P 27/04*     (2016.01)

(52) U.S. Cl.
CPC ......... *H02M 5/4585* (2013.01); *H02P 27/04* (2013.01)

(58) Field of Classification Search
CPC .... H02M 5/4585; H02M 1/007; H02M 1/322; H02M 7/06; H02M 7/797; H02M 7/5387;
(Continued)

(56) References Cited

U.S. PATENT DOCUMENTS

| 5,764,023 A | 6/1998 | Wieloch |
| 8,120,294 B2 * | 2/2012 | Ibori ........................ H02P 3/22 318/375 |

(Continued)

FOREIGN PATENT DOCUMENTS

| CN | 2923639 Y | 7/2007 |
| CN | 201113911 Y | 9/2008 |

(Continued)

OTHER PUBLICATIONS

Received STIC search report from EIC 2800 searcher Steve Chung for claim 1 dated Apr. 23, 2021. (Year: 2021).*

(Continued)

*Primary Examiner* — Shawki S Ismail
*Assistant Examiner* — Htet Z Kyaw
(74) *Attorney, Agent, or Firm* — Lempia Summerfield Katz LLC

(57) ABSTRACT

A frequency converter adapted to be connected to another frequency converter via a direct current bus is provided. The frequency converter comprises: a positive bus interface adapted to be interconnected with a positive bus interface of the other frequency converter; an external bleeder resistor interface adapted to be interconnected with an external bleeder resistor interface of the other frequency converter; and a first control logic which controls a parallel connection, between the frequency converter and the other frequency converter and realized by a direct current bus, to be turned on or off. A corresponding frequency converter assembly, a control method, and a computer readable storage medium are also provided.

17 Claims, 3 Drawing Sheets

(58) Field of Classification Search
CPC ......... H02M 1/32; H02M 5/458; H02P 27/04; H02P 3/02; H02P 3/22
USPC .......................................................... 363/40
See application file for complete search history.

(56) References Cited

U.S. PATENT DOCUMENTS

| | | | | |
|---|---|---|---|---|
| 8,305,018 | B2* | 11/2012 | Okamura | B60L 7/14 318/376 |
| 9,906,219 | B2* | 2/2018 | Bateriwala | H03K 17/567 |
| 2004/0090200 | A1* | 5/2004 | Youm | H02P 1/022 318/434 |
| 2008/0013353 | A1* | 1/2008 | Virolainen | H02M 1/32 363/157 |
| 2011/0127935 | A1* | 6/2011 | Gao | H02M 1/36 318/400.3 |
| 2013/0342136 | A1* | 12/2013 | Ibori | H02P 3/22 318/380 |
| 2014/0292231 | A1 | 10/2014 | Kanada | |
| 2014/0300298 | A1* | 10/2014 | Liu | H02M 5/453 318/380 |
| 2014/0301124 | A1* | 10/2014 | Wu | H02M 5/14 363/132 |

FOREIGN PATENT DOCUMENTS

| | | | |
|---|---|---|---|
| CN | 201113916 Y | 9/2008 | |
| CN | 101559425 A | 10/2009 | |
| CN | 201860125 U | 6/2011 | |
| CN | 103269166 A | 8/2013 | |
| CN | 103887988 A | 6/2014 | |
| CN | 205178866 U | 4/2016 | |
| CN | 206631884 * | 11/2017 | ............... B05D 3/04 |
| EP | 1791246 A2 | 5/2007 | |
| FI | 20055627 A | 5/2007 | |
| FR | 2992118 A1 | 12/2013 | |
| GB | 2281825 A | 3/1995 | |
| WO | 2013186065 A1 | 12/2013 | |

OTHER PUBLICATIONS

Received STIC search report from EIC 2800 searcher Vaisali Koppplu for claim 4 dated Sep. 24, 2021. (Year: 2021).*
Received STIC search report from EIC 2800 searcher Jyothsna Kondamudi for claim 5 dated Sep. 28, 2021. (Year: 2021).*
Received STIC search report from EIC 2800 searcher Jyothsna Kondamudi for claim 8 dated Sep. 28, 2021. (Year: 2021).*
Attached translated version of foreign patent CN206631884. (Year: 2017).*
European Search Report for European Application No. 17925110.3-1201 dated Feb. 16, 2021.
International Search Report and the Written Opinion for International Patent Application PCT/CN2017/101748 dated Jun. 20, 2018.

* cited by examiner

FREQUENCY CONVERTER, FREQUENCY CONVERTER ASSEMBLY, AND CONTROL METHOD THEREOF

CROSS REFERENCE TO RELATED APPLICATIONS

This present patent document is a § 371 nationalization of PCT Application Serial Number PCT/CN2017/101748 filed Sep. 14, 2017, designating the United States, which is hereby incorporated in its entirety by reference.

FIELD

Embodiments relate a frequency converter that may be used for a common direct current bus scheme.

BACKGROUND

Frequency converter loaded electric machines include two operating states: an electrical driving state and a generating state. When an electric machine is decelerating or the rotation speed of a load is higher than that of the electric machine, the electric machine is in a reverse generating state; the electricity that is generated will go back onto a DC bus of the frequency converter, leading to an increase in bus voltage. If the increase is not dealt with promptly, frequency converter overvoltage protection will be triggered. A conventional method is to consume the portion of energy using a braking resistor that is wasteful. Another method is to connect several frequency converter DC buses in parallel and share the portion of surplus energy with other frequency converters for consumption, to avoid wastage. With regard to the second method, if frequency converters of different powers include buses connected in parallel, then during normal operation, a low-power frequency converter will additionally bear the current demand of a high-power frequency converter, increasing the load of a rectifier bridge of the low-power frequency converter, with the result that the rectifier bridge of the low-power frequency converter is damaged very easily.

FIG. 1 depicts a main circuit block diagram of a frequency converter. The frequency converter includes a rectifier bridge 1, a bus capacitor 2, a braking unit 3 and an inverter bridge 4. The braking unit 3 is used to bleed electrical energy arising from reverse generation. In addition, the inverter also reserves three human-machine interface ports, namely a DCP (Direct Current Positive, positive DC bus) interface, a DCN (Direct Current Negative, negative DC bus) interface and a PB (Brake, external braking resistor) interface. DCP and DCN are DC bus interfaces, and PB is an external braking (or bleeder) resistor interface.

When a low-power frequency converter and a high-power frequency converter include a common DC bus voltage, in normal operation the rectifier bridge 1 of the low-power frequency converter additionally bears a current from the high-power frequency converter, leading to overloading of the low-power rectifier bridge 1; in mild cases, overheating protection of the low-power frequency converter will occur, and in serious cases, direct damage will occur. However, the common DC bus scheme is also an environmentally friendly scheme that saves a lot of energy. Thus, there is a need in the industry for a better scheme to eliminate the problem of overloading of the rectifier bridge of the low-power frequency converter to provide a safe implementation of the common DC bus scheme.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide intelligent control of a common DC bus, i.e. realizes a controllable common DC bus connection, with an existing frequency converter using circuit adjustment and operating mode control technology. Embodiments thus provide a common DC bus scheme while avoiding problems such as overloading and overheating in a rectifier bridge of a low-power frequency converter. In addition, embodiments do not need to change the structural design of an existing frequency converter and provide a low-cost improvement scheme.

According to an embodiment, a frequency converter is provided, that is configured for connection to another frequency converter via a DC bus and includes: a positive bus interface, configured for connection to a positive bus interface of the other frequency converter; an external bleeder resistor interface, configured for connection to an external bleeder resistor interface of the other frequency converter, and a first control logic, controlling a bus parallel connection between the frequency converter and the other frequency converter to be turned on or off, the bus parallel connection provided by the DC bus.

According to one embodiment, in the frequency converter, a bus voltage of the DC bus when the frequency converter is powered on and in a standby state is taken as a reference value; when the bus voltage increases above the reference value by greater than or equal to a preset threshold value, the first control logic turns on the bus parallel connection, to realize bus voltage sharing between the frequency converter and the other frequency converter; otherwise, the first control logic turns off the bus parallel connection.

According to an embodiment, the frequency converter includes a first bus capacitor and a first braking unit connected in parallel on the DC bus. The first braking unit further includes a first IGBT and a first diode, the external bleeder resistor interface of the first braking unit is connected between an anode of the first diode and a collector of the first IGBT, one end of the first bus capacitor and a cathode of the first diode are together connected to the positive bus interface of the frequency converter, and another end of the first bus capacitor and an emitter of the first IGBT are together connected to a negative bus interface of the frequency converter.

According to an embodiment, when the frequency converter is in a reverse generating state and the bus voltage increases above the reference value by greater than or equal to a preset threshold value, the first control logic switches on the first IGBT, such that a voltage of the frequency converter enters the other frequency converter through the positive bus interface and returns to the negative bus interface of the frequency converter, to realize the bus voltage sharing.

According to another embodiment, a frequency converter assembly is provided, including a first frequency converter, a second frequency converter and a DC bus, with positive bus interfaces of the first frequency converter and the second frequency converter connected to each other and external bleeder resistor interfaces of the first frequency converter and the second frequency converter connected to each other. A first control logic of the first frequency converter controls a bus parallel connection between the first frequency converter and the second frequency converter to be turned on or off, the bus parallel connection realized by the DC bus.

According to an embodiment a bus voltage of the DC bus when the first or second frequency converter is powered on and in a standby state is taken as a reference value; when the bus voltage increases above the reference value by greater than or equal to a preset threshold value, the first control logic turns on the bus parallel connection between the first and second frequency converters, in order to realize bus voltage sharing between the first and second frequency converters; otherwise, the first control logic turns off the bus parallel connection between the first and second frequency converters.

According to an embodiment the first frequency converter includes a first bus capacitor and a first braking unit connected in parallel on the DC bus. The first braking unit further includes a first IGBT and a first diode, the external bleeder resistor interface of the first braking unit is connected between an anode of the first diode and a collector of the first IGBT, one end of the first bus capacitor and a cathode of the first diode are together connected to the positive bus interface of the first frequency converter, and another end of the first bus capacitor and an emitter of the first IGBT are together connected to a negative bus interface of the first frequency converter; the second frequency converter includes a second bus capacitor and a second braking unit connected in parallel on the DC bus. The second braking unit further includes a second IGBT and a second diode, the external bleeder resistor interface of the second braking unit is connected between an anode of the second diode and a collector of the second IGBT, one end of the second bus capacitor and a cathode of the second diode are together connected to the positive bus interface of the second frequency converter, and another end of the second bus capacitor and an emitter of the second IGBT are together connected to a negative bus interface of the second frequency converter.

According to an embodiment, in the frequency converter assembly, when the first frequency converter is in a reverse generating state and the bus voltage increases above the reference value by greater than or equal to a preset threshold value, the first control logic switches on the first IGBT, such that a voltage of the first frequency converter enters the second frequency converter through the positive bus interface and sequentially passes through the second bus capacitor, an anti-parallel-connected diode of the second IGBT, the external bleeder resistor interfaces and the first IGBT, returning to the negative bus interface of the first frequency converter, to realize the bus voltage sharing.

According to an embodiment, in the frequency converter assembly, the second frequency converter includes a second control logic, that controls a bus parallel connection between the first frequency converter and the second frequency converter to be turned on or off, the bus parallel connection provided by the DC bus. When the second frequency converter is in a reverse generating state and the bus voltage increases above the reference value by greater than or equal to a preset threshold value, the second control logic switches on the second IGBT, such that a voltage of the second frequency converter enters the first frequency converter through the positive bus interface and sequentially passes through the first bus capacitor, an anti-parallel-connected diode of the first IGBT, the external bleeder resistor interfaces and the second IGBT, returning to the negative bus interface of the second frequency converter, to provide the bus voltage sharing.

According to an embodiment, in the frequency converter assembly, the negative bus interfaces of the first and second frequency converters are disconnected from one another.

According to an embodiment, in the frequency converter assembly, the first frequency converter includes a higher power than the second frequency converter.

According to an embodiment, a control method is provided, that is configured for a frequency converter assembly including a first frequency converter, a second frequency converter and a DC bus. Positive bus interfaces of the first frequency converter and the second frequency converter are connected to each other and external bleeder resistor interfaces of the first frequency converter and the second frequency converter are connected to each other. The control method includes controlling a bus parallel connection between the first frequency converter and the second frequency converter to be turned on or off, the bus parallel connection provided by the DC bus.

According to an embodiment, the control method further includes:

a. taking as a reference value a bus voltage of the DC bus when the first or second frequency converter is powered on and in a standby state;

b. when the bus voltage increases above the reference value by greater than or equal to a preset threshold value, a first control logic turning on the bus parallel connection between the first and second frequency converters, to realize bus voltage sharing between the first and second frequency converters; otherwise, the first control logic turning off the bus parallel connection between the first and second frequency converters.

According to an embodiment, the first frequency converter includes a first bus capacitor and a first braking unit connected in parallel on the DC bus. The first braking unit further includes a first IGBT and a first diode, the external bleeder resistor interface of the first braking unit is connected between an anode of the first diode and a collector of the first IGBT, one end of the first bus capacitor and a cathode of the first diode are together connected to the positive bus interface of the first frequency converter, and another end of the first bus capacitor and an emitter of the first IGBT are together connected to a negative bus interface of the first frequency converter; the second frequency converter includes a second bus capacitor and a second braking unit connected in parallel on the DC bus. The second braking unit further includes a second IGBT and a second diode, the external bleeder resistor interface of the second braking unit is connected between an anode of the second diode and a collector of the second IGBT, one end of the second bus capacitor and a cathode of the second diode are together connected to the positive bus interface of the second frequency converter, and another end of the second bus capacitor and an emitter of the second IGBT are together connected to a negative bus interface of the second frequency converter.

According to an embodiment, step b further includes: when the first frequency converter is in a reverse generating state and the bus voltage increases above the reference value by greater than or equal to a preset threshold value, the first control logic switching on the first IGBT, such that a voltage of the first frequency converter enters the second frequency converter through the positive bus interface and sequentially passes through the second bus capacitor, an anti-parallel-connected diode of the second IGBT, the external bleeder resistor interfaces and the first IGBT, returning to the negative bus interface of the first frequency converter, to provide the bus voltage sharing.

According to an embodiment, the second frequency converter includes a second control logic that controls a bus parallel connection between the first frequency converter and the second frequency converter to be turned on or off, the bus parallel connection provided by the DC bus, and step b further includes: when the second frequency converter is in a reverse generating state and the bus voltage increases above the reference value by greater than or equal to a preset threshold value, the second control logic switches on the second IGBT, such that a voltage of the second frequency converter enters the first frequency converter through the positive bus interface and sequentially passes through the first bus capacitor, an anti-parallel-connected diode of the first IGBT, the external bleeder resistor interfaces and the second IGBT, returning to the negative bus interface of the second frequency converter, to realize the bus voltage sharing.

According to an embodiment, the first frequency converter includes a higher power than the second frequency converter.

According to an embodiment, a computer-readable storage medium is provided, including a computer program stored thereon that when executed by a processor, the program provides the control method.

DETAILED DESCRIPTION

The basic principles and embodiments are discussed in more detail with reference to FIGS. 2 and 3.

Figure 1:
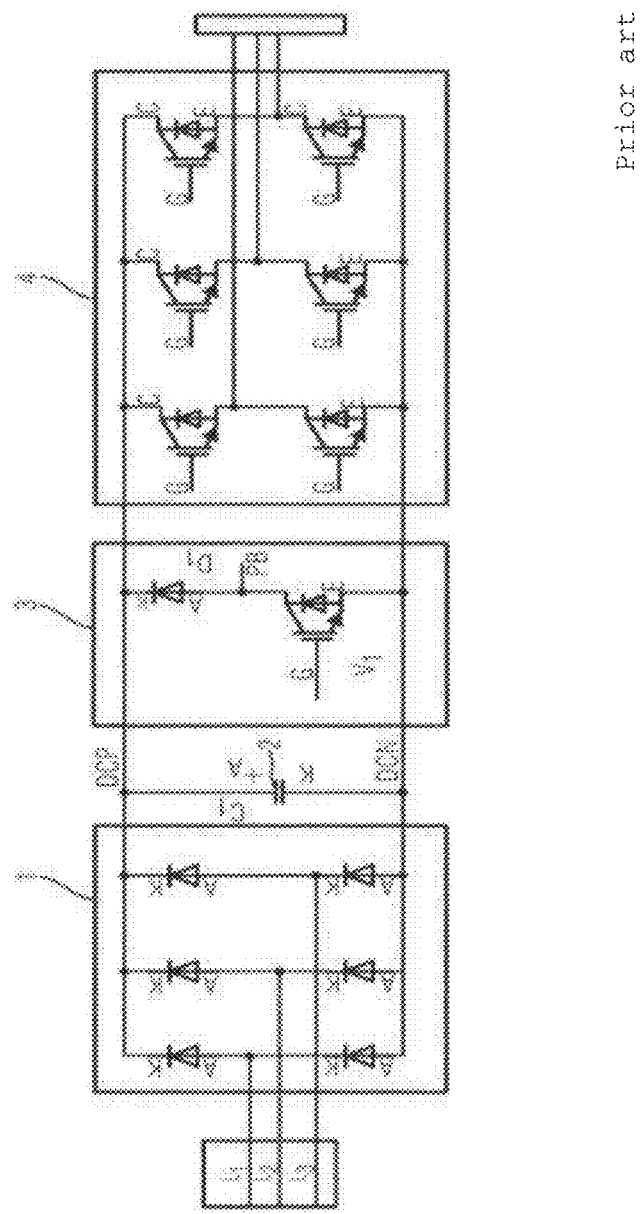
FIG. 1 depicts a main circuit block diagram of a frequency converter.
Figure 2:
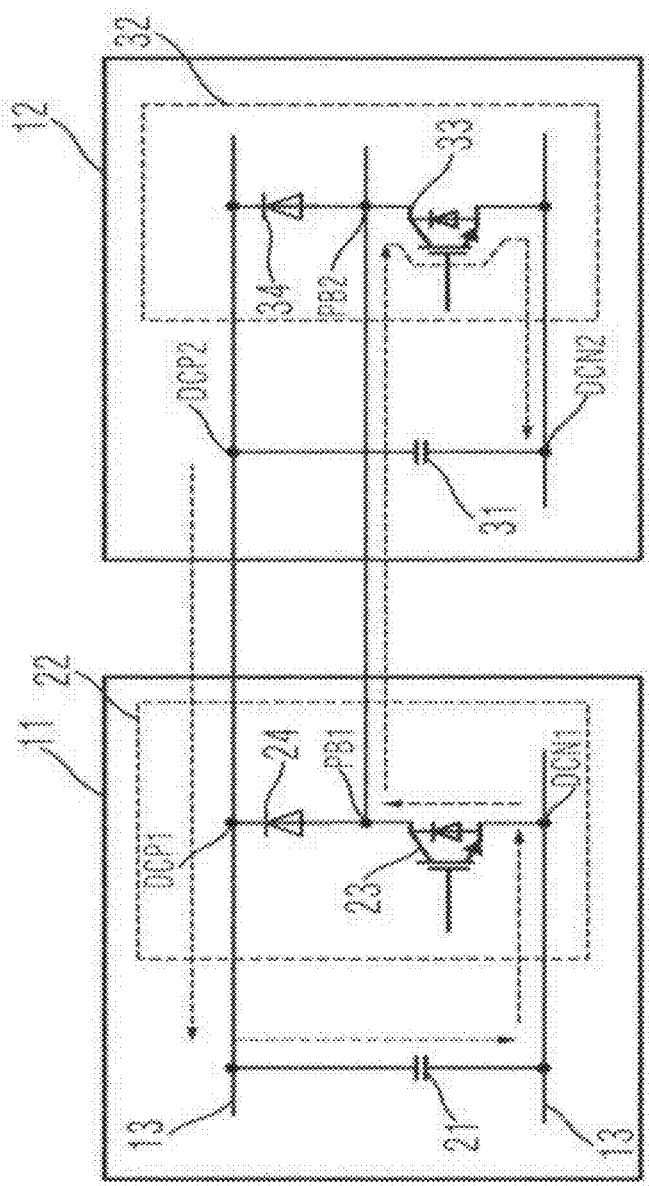
FIG. 2 depicts a partial circuit diagram of a frequency converter assembly according to an embodiment and the direction of current flow.

In FIG. 2, a frequency converter assembly includes: a first frequency converter 11, a second frequency converter 12 and a DC bus 13. The sizes of the powers of the first frequency converter 11 and the second frequency converter 12 may be different, but the power of the first frequency converter 11 may greater than the power of the second frequency converter 12. For example, positive bus interfaces DCP1 and DCP2 of the first frequency converter 11 and the second frequency converter 12 (i.e. interfaces on the frequency converters for connecting the positive bus) are connected to each other, and external bleeder resistor interfaces PB1 and PB2 of the first frequency converter 11 and the second frequency converter 12 (i.e. interfaces on the frequency converters for external bleeder/braking resistors) are connected to each other. In an embodiment, control logic (not shown) of the first frequency converter 11 controls a bus parallel connection between the first frequency converter 11 and the second frequency converter 12 to be turned on or off, the bus parallel connection provided by the DC bus 13. In other words, in the connection state, the control logic controls the bus parallel connection to be turned on or off as required. For example, the control logic turns on the bus parallel connection when the first frequency converter 11 is in a reverse generating state, in order to realize bus voltage sharing, and turns off the bus parallel connection upon determining that bus sharing is not required, to avoid a situation in which a rectifier bridge of the second frequency converter 12 with the lower power bears a current demand of the first frequency converter 11 with the higher power.

Furthermore, as an example of a condition for determining whether there is a need for outward bus sharing, a bus voltage of the DC bus when the first frequency converter 11 (with the higher power) is powered on and in a standby state may be taken as a reference value. Then, when the bus voltage increases above the reference value by greater than or equal to a preset threshold value (the preset threshold value may for example be 80 V-120 V, e.g. 100 V), the control logic turns on the bus parallel connection between the first frequency converter 11 and the second frequency converter 12, to realize bus voltage sharing between the first frequency converter 11 and the second frequency converter 12; otherwise, the control logic turns off the bus parallel connection between the first and second frequency converters.

Figure 3:
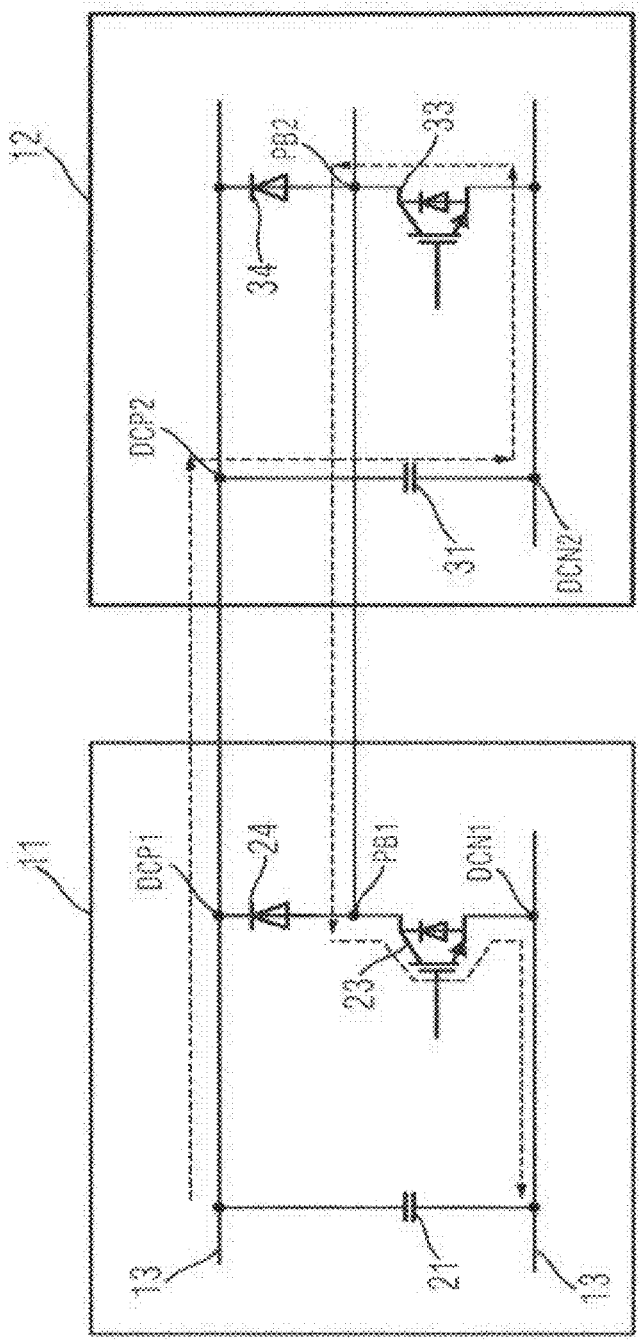
FIG. 3 depicts a partial circuit diagram of a frequency converter assembly according to another embodiment and the direction of current flow.

In the embodiments depicted in FIGS. 2 and 3, the first frequency converter 11 may include a first bus capacitor 21 and a first braking unit 22 connected in parallel on the DC bus 13. The first braking unit 22 further includes a first IGBT 23 and a first diode 24. The external bleeder resistor interface PB1 of the first braking unit 22 is connected between an anode of the first diode 24 and a collector of the first IGBT 23. One end of the first bus capacitor 21 and a cathode of the first diode 24 are together connected to the positive bus interface DCP1 of the first frequency converter 11; another end of the first bus capacitor 21 and an emitter of the first IGBT 23 are together connected to a negative bus interface DCN1 of the first frequency converter 11.

The second frequency converter 12 may include a second bus capacitor 31 and a second braking unit 32 connected in parallel on the DC bus 13. The second braking unit 32 further includes a second IGBT 33 and a second diode 34. The external bleeder resistor interface PB2 of the second braking unit 32 is connected between an anode of the second diode 34 and a collector of the second IGBT 33. One end of the second bus capacitor 31 and a cathode of the second diode 34 are together connected to the positive bus interface DCP2 of the second frequency converter 12. Another end of the second bus capacitor 31 and an emitter of the second IGBT 33 are together connected to a negative bus interface DCN2 of the second frequency converter 12.

Based on the circuit structure, when the first frequency converter 11 is in a reverse generating state and the bus voltage increases above a reference value by greater than or equal to a preset threshold value (e.g. 100 V), the control logic switches on the first IGBT 23, such that a voltage of the first frequency converter 11 enters the second frequency converter 12 through the positive bus interface DCP1 and sequentially passes through the second bus capacitor 31, an anti-parallel-connected diode of the second IGBT 33, the external bleeder resistor interfaces PB2 and PB1, and the first IGBT 23, returning to the negative bus interface DCN1 of the first frequency converter 11, to provide bus voltage sharing, as indicated by the flow direction of the dotted arrow in FIG. 3.

In addition, according to another example, in a frequency converter assembly, a second control logic (not shown) may also be disposed in the second frequency converter 12 (i.e. the frequency converter with the lower power). The second control logic and a first control logic are independent of each other, and the second control logic may also control a bus parallel connection between the first frequency converter 11 and the second frequency converter 12 to be turned on or off, the bus parallel connection provided by the DC bus 13. For example, based on the circuit structure described above, when the second frequency converter 12 is in a reverse generating state and the bus voltage increases above a reference value by greater than or equal to the abovementioned preset threshold value (e.g. 100 V), the control logic switches on the second IGBT 33 (i.e. switches on the corresponding IGBT to establish a current loop), such that a voltage of the second frequency converter 12 enters the first frequency converter 11 through the positive bus interface DCP2 and sequentially passes through the first bus capacitor 21, an anti-parallel-connected diode of the first IGBT 23, the external bleeder resistor interfaces PB1 and PB2, and the second IGBT 33, returning to the negative bus interface DCN2 of the second frequency converter 12, to provide bus voltage sharing, as indicated by the flow direction of the dotted arrow in FIG. 2.

In the circuit structure described above, the negative bus interface DCN1 of the first frequency converter 11 and the negative bus interface DCN2 of the second frequency converter 12 are disconnected from one another. In addition, the control method in the above embodiments may be recorded in the form of software in the first or second control logic, or may be stored in a configured computer-readable storage medium and be read and executed by the first or second control logic.

The frequency converter assembly makes use of devices in the interior of an existing frequency converter, with no need to add any other device, and provides a controllable common DC bus connection using a simple control. When the frequency converter uses the common DC bus usage, it is possible to switch off a bleeding function of the braking unit by the control logic and invoke a common DC bus function. For example, when the bus voltage has met a certain condition, the corresponding braking unit IGBT is controlled to be turned on, providing controllable parallel connection. In addition, turn-off is performed when there is no need to share the bus (e.g. lower than 100 V), to fully provide that when the bus voltage is shared, the shared electrical energy comes from reverse generation energy and not rectifier bridge energy, avoiding a situation in which the rectifier bridge of the low-power frequency converter performs shunting on the high-power frequency converter, thereby being overloaded and suffering a damaging fault.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A frequency converter for connection to another frequency converter via a DC bus, wherein the frequency converter includes a higher power than the other frequency converter, the frequency converter comprising:
 a positive bus interface configured to connect to a positive bus interface of the other frequency converter;
 an external bleeder resistor interface configured to connect to an external bleeder resistor interface of the other frequency converter, and
 a first control logic configured to turn on and off a bus parallel connection between the frequency converter and the other frequency converter, the bus parallel connection provided by the DC bus;
 wherein when a bus voltage increases above a reference value by greater than or equal to a preset threshold value, the first control logic is configured to turn on the bus parallel connection to provide bus voltage sharing between the frequency converter and the other frequency converter;
 wherein when the bus voltage decreases below the reference value, the first control logic is configured to switch off the bus parallel connection to avoid where a rectifier bridge of the other frequency converter bears a current demand of the frequency converter.

2. The frequency converter of claim 1, wherein a bus voltage of the DC bus when the frequency converter is powered on and in a standby state is used as the reference value.

3. The frequency converter of claim 1, wherein the frequency converter comprises a first bus capacitor and a first braking unit connected in parallel on the DC bus, wherein the first braking unit further comprises a first IGBT and a first diode, wherein the external bleeder resistor interface of the first braking unit is connected between an anode of the first diode and a collector of the first IGBT, one end of the first bus capacitor and a cathode of the first diode are together connected to the positive bus interface of the frequency converter, wherein another end of the first bus capacitor and an emitter of the first IGBT are together connected to a negative bus interface of the frequency converter.

4. The frequency converter of claim 3, wherein when the frequency converter is in a reverse generating state and the bus voltage increases above the reference value by greater than or equal to the preset threshold value, the first control logic is configured to switch on the first IGBT, such that a voltage of the frequency converter enters the other frequency converter through the positive bus interface and returns to the negative bus interface of the frequency converter, to provide the bus voltage sharing.

5. A frequency converter assembly comprising:
 a first frequency converter;
 a second frequency converter, wherein the second frequency converter includes a lower power than the first frequency converter; and
 a DC bus;
 wherein positive bus interfaces of the first frequency converter and the second frequency converter are connected to each other and external bleeder resistor interfaces of the first frequency converter and the second frequency converter are connected to each other,
 wherein a first control logic of the first frequency converter controls a bus parallel connection between the first frequency converter and the second frequency converter to be turned on or off, wherein the bus parallel connection is provided by the DC bus;
 wherein when a bus voltage increases above a reference value by greater than or equal to a preset threshold value, the first control logic is configured to turn on the bus parallel connection to provide bus voltage sharing between the first frequency converter and the second frequency converter;

wherein when the bus voltage decreases below the reference value, the first control logic is configured to switch off the bus parallel connection to avoid where a rectifier bridge of the second frequency converter bears a current demand of the first frequency converter.

6. The frequency converter assembly of claim 5, wherein a bus voltage of the DC bus when the first or second frequency converter is powered on and in a standby state is used as the reference value;

wherein when the bus voltage increases above the reference value by greater than or equal to the preset threshold value, the first control logic is configured to turn on the bus parallel connection to provide bus voltage sharing between the first frequency converter and the second frequency converter; and wherein when the bus voltage is below the reference value, the first control logic is configured to turn off the bus parallel connection.

7. The frequency converter of claim 6, wherein the first frequency converter comprises a first bus capacitor and a first braking unit connected in parallel on the DC bus, wherein the first braking unit further comprises a first IGBT and a first diode, the external bleeder resistor interface of the first braking unit is connected between an anode of the first diode and a collector of the first IGBT, one end of the first bus capacitor and a cathode of the first diode are together connected to the positive bus interface of the first frequency converter, and another end of the first bus capacitor and an emitter of the first IGBT are together connected to a negative bus interface of the first frequency converter;

wherein the second frequency converter comprises a second bus capacitor and a second braking unit connected in parallel on the DC bus, wherein the second braking unit further comprises a second IGBT and a second diode, the external bleeder resistor interface of the second braking unit is connected between an anode of the second diode and a collector of the second IGBT, one end of the second bus capacitor and a cathode of the second diode are together connected to the positive bus interface of the second frequency converter, and another end of the second bus capacitor and an emitter of the second IGBT are together connected to a negative bus interface of the second frequency converter.

8. The frequency converter of claim 7, wherein when the first frequency converter is in a reverse generating state and the bus voltage increases above the reference value by greater than or equal to a preset threshold value, the first control logic is configured to switch on the first IGBT, such that a voltage of the first frequency converter enters the second frequency converter through the positive bus interface and sequentially passes through the second bus capacitor, an anti-parallel-connected diode of the second IGBT, the external bleeder resistor interfaces, and the first IGBT, returning to the negative bus interface of the first frequency converter, to provide the bus voltage sharing.

9. The frequency converter of claim 7, wherein the second frequency converter comprises a second control logic that is configured to control a bus parallel connection between the first frequency converter and the second frequency converter to be turned on or off, wherein the bus parallel connection is provided by the DC bus; when the second frequency converter is in a reverse generating state and the bus voltage increases above the reference value by greater than or equal to a preset threshold value, the second control logic is configured to switch on the second IGBT, such that a voltage of the second frequency converter enters the first frequency converter through the positive bus interface and sequentially passes through the first bus capacitor, an anti-parallel-connected diode of the first IGBT, the external bleeder resistor interfaces, and the second IGBT, returning to the negative bus interface of the second frequency converter, to provide the bus voltage sharing.

10. The frequency converter assembly of claim 7, wherein the negative bus interfaces of the first and second frequency converters are disconnected from one another.

11. A control method for a frequency converter assembly comprising a first frequency converter, a second frequency converter and a DC bus, wherein the second frequency converter includes a lower power than the first frequency converter, wherein positive bus interfaces of the first frequency converter and the second frequency converter are connected to each other and external bleeder resistor interfaces of the first frequency converter and the second frequency converter are connected to each other, the control method comprising:

controlling a bus parallel connection between the first frequency converter and the second frequency converter to be turned on or off, wherein the bus parallel connection is provided by the DC bus;

wherein when a bus voltage increases above a reference value by greater than or equal to a preset threshold value, the first control logic is configured to turn on the bus parallel connection to provide bus voltage sharing between the first frequency converter and the second frequency converter;

wherein when the bus voltage decreases below the reference value, the first control logic is configured to switch off the bus parallel connection to avoid where a rectifier bridge of the second frequency converter bears a current demand of the first frequency converter.

12. The control method of claim 11, wherein the control method further comprises:

setting a bus voltage of the DC bus when the first or second frequency converter is powered on and in a standby state as the reference value.

13. The control method of claim 12, wherein the first frequency converter comprises a first bus capacitor and a first braking unit connected in parallel on the DC bus, wherein the first braking unit further comprises a first IGBT and a first diode, the external bleeder resistor interface of the first braking unit is connected between an anode of the first diode and a collector of the first IGBT, one end of the first bus capacitor and a cathode of the first diode are together connected to the positive bus interface of the first frequency converter, and another end of the first bus capacitor and an emitter of the first IGBT are together connected to a negative bus interface of the first frequency converter;

wherein the second frequency converter comprises a second bus capacitor and a second braking unit connected in parallel on the DC bus, wherein the second braking unit further comprises a second IGBT and a second diode, the external bleeder resistor interface of the second braking unit is connected between an anode of the second diode and a collector of the second IGBT, one end of the second bus capacitor and a cathode of the second diode are together connected to the positive bus interface of the second frequency converter, and another end of the second bus capacitor and an emitter of the second IGBT are together connected to a negative bus interface of the second frequency converter.

14. The control method of claim 13, wherein turning on the bus parallel connection further comprises:
when the first frequency converter is in a reverse generating state and the bus voltage increases above the reference value by greater than or equal to a preset threshold value, switching on the first IGBT, such that a voltage of the first frequency converter enters the second frequency converter through the positive bus interface and sequentially passes through the second bus capacitor, an anti-parallel-connected diode of the second IGBT, the external bleeder resistor interfaces, and the first IGBT, returning to the negative bus interface of the first frequency converter, to realize the bus voltage sharing.

15. The control method of claim 13, wherein the second frequency converter comprises a second control logic that is configured to controls a bus parallel connection between the first frequency converter and the second frequency converter to be turned on or off, the bus parallel connection provided by the DC bus, wherein turning on the bus parallel connection further comprises:
when the second frequency converter is in a reverse generating state and the bus voltage increases above the reference value by greater than or equal to a preset threshold value, the second control logic is configured to switch on the second IGBT, such that a voltage of the second frequency converter enters the first frequency converter through the positive bus interface and sequentially passes through the first bus capacitor, an anti-parallel-connected diode of the first IGBT, the external bleeder resistor interfaces and the second IGBT, returning to the negative bus interface of the second frequency converter, to provide the bus voltage sharing.

16. The control method of claim 11, wherein the first frequency converter includes a higher power than the second frequency converter.

17. A non-transitory computer implemented storage medium that stores machine-readable instructions configured to:
turn on or off a bus parallel connection between a first frequency converter and a second frequency converter of a frequency converter assembly that comprises the first frequency converter, the second frequency converter and a DC bus,
wherein positive bus interfaces of the first frequency converter and the second frequency converter are connected to each other and external bleeder resistor interfaces of the first frequency converter and the second frequency converter are connected to each other;
wherein the bus parallel connection is provided by the DC bus;
wherein when the bus voltage increases above a reference value by greater than or equal to a preset threshold value, the machine-readable instructions are configured to turn on the bus parallel connection to provide bus voltage sharing between the first frequency converter and the second frequency converter;
wherein when the bus voltage decreases below the reference value, the machine-readable instructions are configured to switch off the bus parallel connection to avoid where a rectifier bridge of the second frequency converter bears a current demand of the first frequency converter.

* * * * *